3,144,038
SEQUENTIAL IRRIGATION VALVE
Robert E. Stilwell, Santa Clara, Calif., assignor to FMC Corporation, San Jose, Calif., a corporation of Delaware
Filed Sept. 20, 1962, Ser. No. 225,063
5 Claims. (Cl. 137—119)

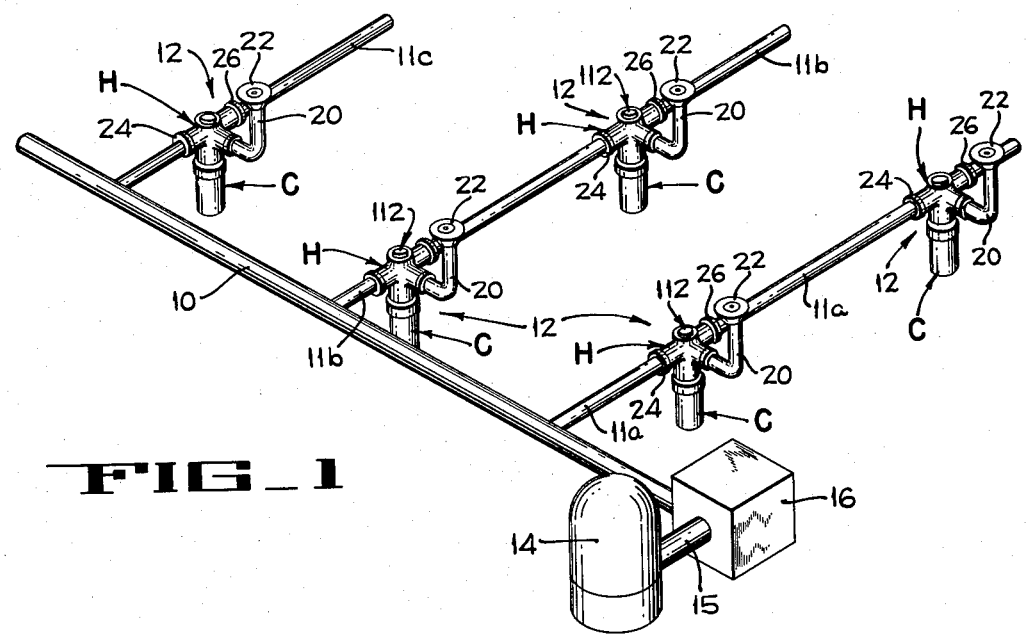
FIG_1
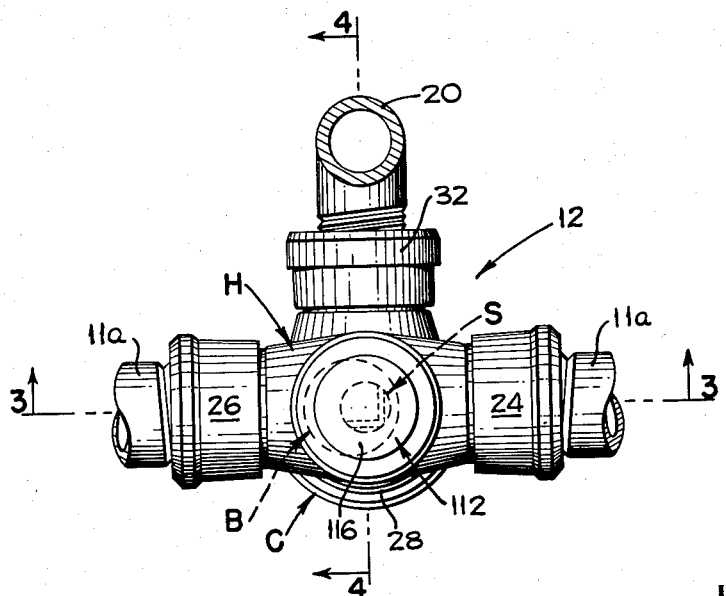
FIG_2

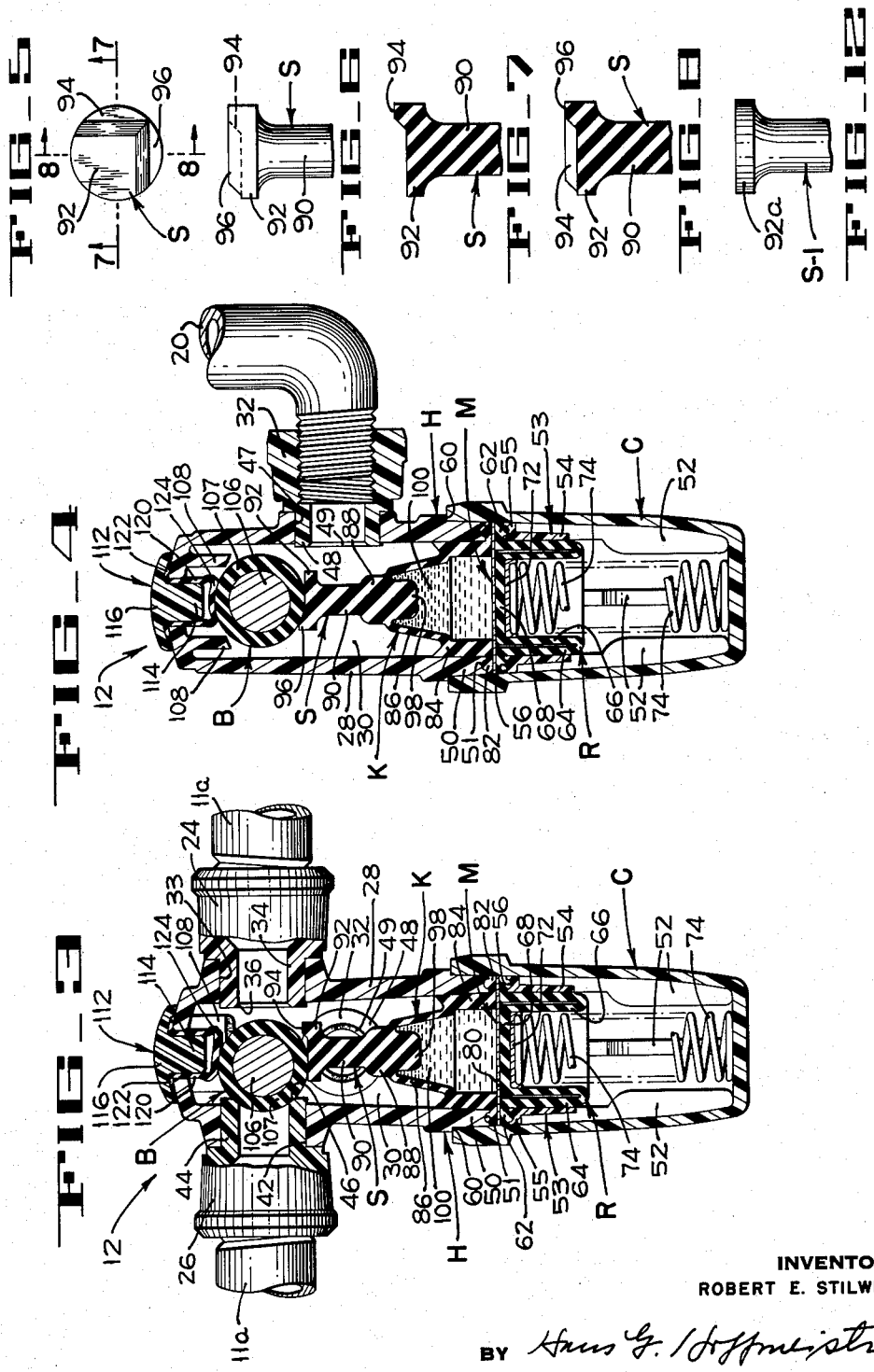

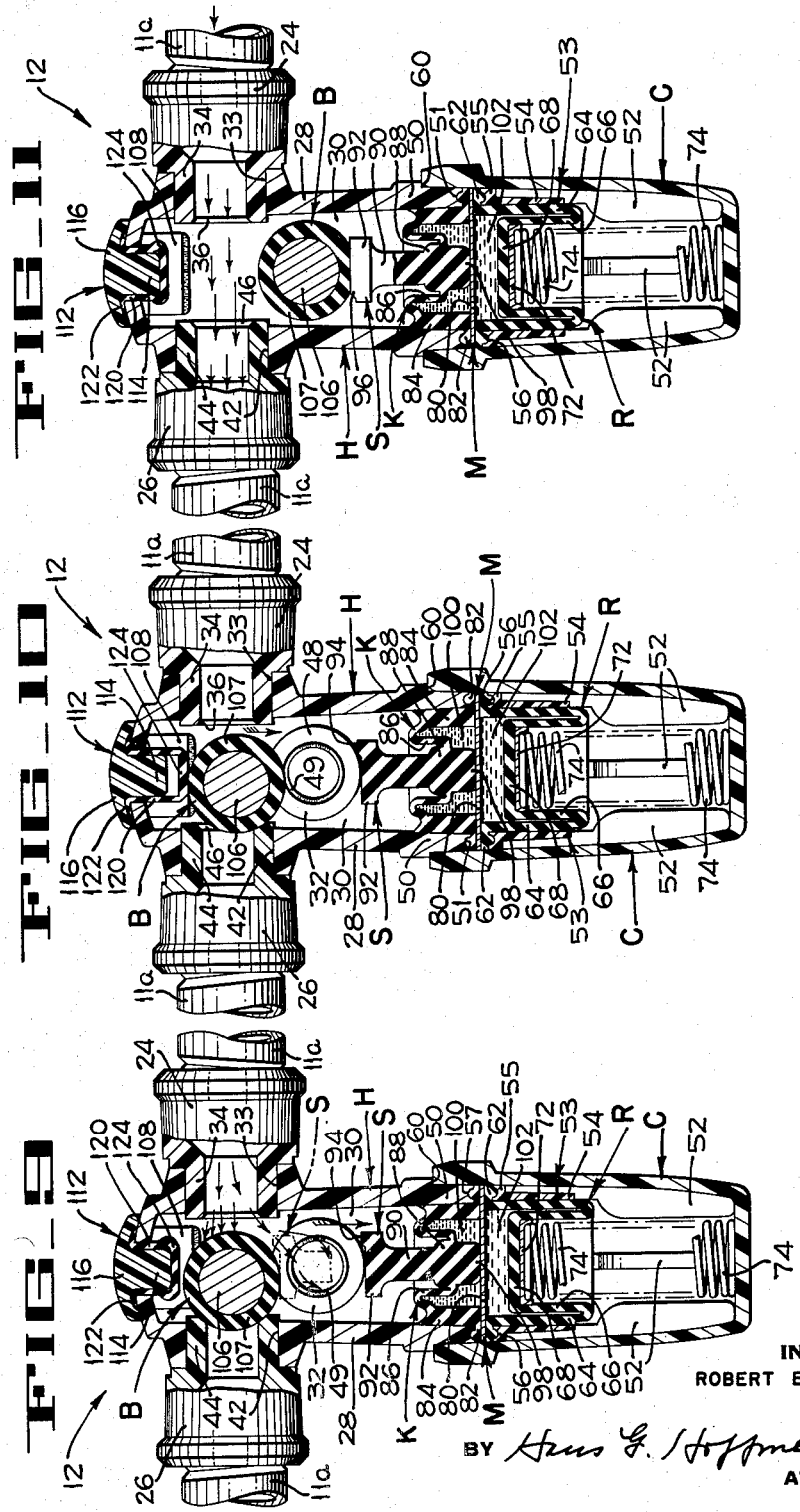

The present invention relates to irrigation systems of the sequential type, and more particularly to the sequence discharge or sprinkler valves used in such irrigation systems.

Systems of the type to which this invention relates include a water supply line and one or more lateral lines or branch conduits carrying a row of sequence valves, which valves mount sprinkler heads. The sprinkler heads in each conduit successively receive water for sprinkling, one by one, from the associated sequence valves.

The operation of the sequence valves in one conduit will be described briefly. When water under pressure is first introduced into the system, the first valve, which is the valve nearest the supply line, will close off the section of the conduit on the downstream side of the valve, and a sprinkler port of the first sequence valve will be open. In order to control the sequence valves, a water pressure controller is connected in the supply line for periodically causing pressure in the valved conduit to be momentarily reduced, and then restored to operating pressure for a length of time representing a sprinkling cycle.

After conduit pressure has been initially established, momentarily reduced, and then restored to operation pressure for the first time, the first sequence valve in the conduit will have completed a sprinkling cycle, will have automatically closed off its sprinkler port. The valve will have simultaneously opened a conduit outlet port, so that water passes directly through the first sequence valve, and on to the second, or downstream, sequence valve.

The second sequential irrigation valve now assumes its sprinkling function. As pressure is cyclically varied by the controller, this mode of operation continues sequentially along each conduit. At the end of a complete irrigation cycle, each sequence valve will have first sprinkled the surrounding area, and will have then closed off its sprinkler port and connected the water pressure source to the next succeeding sequence valve. During an irrigation cycle, once a sequence valve closes off its sprinkler port, that port remains closed during successive sprinkling cycles occuring at sequence valves mounted down the line.

A valve for use in such a system is described in detail in the copending application of Stilwell et al., Serial No. 766,912, filed October 13, 1958, now Patent Number 3,080,881, and assigned to the assignee of this application, and over which the valve of this invention is an improvement. The sequence valve of the present invention includes a valve member in the form of a rubber ball that first closes the conduit outlet port, leaving the sprinkler port open, and then closes the sprinkler port, leaving the conduit outlet port open, under remote pressure control. A pressure responsive valve ball actuator is provided that first supports the ball adjacent the conduit outlet port. The actuator is hydraulically cocked during sprinkling, and during the momentary pressure reduction the ball drops under force of gravity from the conduit outlet port to the sprinkler port. This construction provides a free, non-binding action as well as a self-cleaning action. This construction also has an advantage in that there are no sliding parts in the chamber exposed to the irrigation water that can become clogged or jammed, and the parts are simple and economical to construct.

It is an object of the present invention to provide reliable sequential irrigation valve operation under relatively low water pressures at the valves.

Another object is to minimize the friction drop at each valve during its sprinkling cycle.

A further object is to prevent abnormal valve sequencing in the form of an abnormal shifting of the valve to its non-sprinkling condition during a sprinkling cycle, upon occurrence of temporary, abnormally low pressure conditions in the valve chamber. Such conditions often arise when air is trapped in the water flowing through the valve.

Still another object is to eliminate the need for resilient valve shifting elements connected between the valve actuator and the valve member or valve ball. Such shifting elements must be stretched or resiliently deformed every time that the pressure responsive valve actuator is cocked. Elimination of this resilient connecting element renders cycle and load tests on such elements unnecessary, and eliminates fatigue problems in service.

As mentioned, in accordance with the present invention, the above objects are attained by making the valve ball gravity operated. The ball is initially supported at the outlet conduit on a stool member that projects from the pressure responsive hydraulic actuator. When the actuator is cocked by water pressure, the stool is moved down, clear of the ball. The ball is now held at the outlet conduit by water pressure, which need only resist the force of gravity. The actuator exerts no force on the ball, and since there are no connections between the actuator and the ball, the sprinkler port is unobstructed during sprinkling. When water pressure is reduced for valve sequencing, the valve ball merely drops by gravity to the stool beneath, and the stool now supports the ball in front of the sprinkling port, ready for closing off that port when water pressure is restored.

Another object of the invention is to provide an initial flow restriction at the sprinkler port of each sequence valve that is about to receive water for sprinkling for the first time. This initial flow restriction at the sequence valve whose sprinkler port is open, develops a higher pressure in all upstream valves. This increased pressure provides rapid re-seating of the valve balls of such upstream valves against their respective sprinkler ports.

This object is attained by the stool that initially supports the valve ball at the outlet conduit port. In the initial, or uncocked position of the actuator, the stool partially restricts flow through the sprinkler port of the valve, which increases the pressure at upstream valves. The actuator is cocked early in the sprinkling cycle, and the stool is withdrawn completely clear of the sprinkler port. Thus flow of water out the sprinkling port is unobstructed during a major portion of the sprinkling cycle.

Another object of the invention is to position the valve ball adjacent to the outlet conduit before the valve receives water for the first time, and to position the valve ball adjacent the sprinkler port in valves that have concluded their sprinkling cycle during the time that line pressure has been momentarily reduced by the controller, in order to sequence the downstream valves that have not sprinkled. This reduces "dribble" and reduces the effect of cumulative pressure drops in the conduit due to the presence of a large number of valves in each conduit.

This object is accomplished by forming the valve ball supporting stool with ledge means that bias the ball toward the respective ports on which it is to seat under the application of water pressure.

A further object is to insure that the valve ball cannot jam within the sequence valve chamber. Such jamming is prevented by making the upper part of the stool of large enough dimension to preclude forcing of the valve ball between the stool and the valve housing.

Another object is to prevent the valve ball from jamming in a port. This is accomplished by providing a rigid core for the ball, which is covered with rubber or the like for seating.

Other objects and advantages of the present invention will become apparent from the following description and the accompanying drawings, in which:

FIGURE 1 is a diagrammatic prespective of a portion of a sequential irrigation system fitted with sequence valves that embody the invention.

FIGURE 2 is a plan of the sequence valve of the present invention, with the conduit and sprinkler connections broken away.

FIGURE 3 is a vertical medial section taken on lines 3—3 of FIGURE 2, illustrating the initial, or inactive position of the valve, with no water pressure applied thereto.

FIGURE 4 is a vertical section taken on lines 4—4 of FIGURE 2, with the valve in its initial condition.

FIGURE 5 is a plan of the valve ball supporting stool.

FIGURE 6 is a fragmentary side elevation of the stool.

FIGURE 7 is a section of the stool taken on lines 7—7 of FIGURE 5.

FIGURE 8 is a section of the stool taken on lines 8—8 of FIGURE 5.

FIGURE 9 is a section of the valve similar to FIGURE 3, illustrating a first operational position of the valve member, wherein water pressure has first been applied to the valve, the downstream conduit port is closed off and the sprinkler port is open.

FIGURE 10 is a vertical section similar to FIGURE 3, showing an intermediate operational position of the valve member, wherein water pressure has been interrupted, and the valve ball is dropping toward the sprinkler port.

FIGURE 11 is a section similar to FIGURE 10 but showing the sprinkler port closed off, and with water flowing through the valve conduit ports to the downstream sequence valve.

FIGURE 12 is a side elevation of a modified stool.

General Description

Referring to FIG. 1, a sequential irrigation system is shown in part. The system comprises a main pipe or water supply line 10, and a plurality of spaced, parallel branch lateral lines or conduits 11a, 11b, 11c, etc. Located along each of the conduits is a row of sequence valve members 12. Water is supplied to the system by a pump 14 of conventional design which connects by a line 15 to an automatic controller 16. The controller 16, the details of which form no part of the present invention, includes a valve between pump line 15 and the water supply line 10, and a timer for actuating the valve. The controller 16 supplies water under pressure to the supply line 10 to initiate an irrigation cycle, and automatically effects a series of temporary reductions in the pressure of the water within the system, as previously described. A control system suitable for this purpose is described and claimed in the application of Fowler, Serial Number 32,-749, now Patent Number 3,086,604, filed May 31, 1960, and assigned to the assignee of the present application.

As seen in FIGS. 1 and 4, a bent riser pipe 20 is connected to each of the sequence valves 12, and each riser pipe 20 carries at its upper end a sprinkler head 22 (FIG. 1).

Referring to FIGS. 3 and 4, the sequence valve 12 illustrated therein comprises a hollow, T-shaped upper housing portion H, having a cross-bar portion formed of an inlet conduit nipple 24, and an outlet conduit nipple 26, which nipples are connected to the branch conduits 11a, 11b, etc. The upper valve housing portion H has a stem portion 28, that provides a valve chamber 30 in communication with the inlet and outlet conduit nipples 24 and 26. The valve is installed vertically (see FIG. 1), and as seen in FIG. 4, the riser pipe 20, which bears the sprinkler head 22 (FIG. 1), is connected to the stem portion 28 of the T-shaped housing portion H by a sprinkler outlet nipple 32, which threadedly receives the sprinkler riser pipe 20. Thus the sprinkler pipe 20 also communicates with the valve chamber 30. As seen in FIGS. 3 and 4, the housing includes a cap portion C, which mounts the valve actuator. The valve actuator is formed of reservoir diaphragm R, a control chamber diaphragm K mounting the stool S, and a metering plate M is mounted between the diaphragms. A valve ball B is shown supported by the stool S in FIGS. 3 and 4.

Valve Construction Details

The valve construction details will be described relative to the vertical sections of FIGURES 3 and 4 plus the details of the stool shown in FIGURES 5 to 8. The upper housing portion H of the valve body is formed with a bore 33 mounting the conduit inlet nipple 24. The inlet nipple has a neck portion 34 which snugly fits the bore 33. These and other valve body or housing parts are formed of a molded plastic material. To assemble the parts, a solvent type cement is applied at the joints, which cement joins the parts when they are pressed together after application of the solvent. The other parts of the valve which are made of plastic are jointed in the same manner, and reference to this method of joining will therefore not be repeated.

At the inner end of neck 34 of the conduit inlet nipple 24, a conduit inlet valve seat 36 is formed, which seat defines the conduit inlet port. In the form of valve assembly illustrated in FIGURES 2 to 11, the valve seat 36 at the conduit inlet nipple is not utilized, but as will be explained presently, this seat can be utilized, if a modified form of stool is applied, whereupon the valve can be reversibly installed in the conduit.

The upper housing portion H is also formed with a bore 42 for receiving a neck 44 of the conduit outlet nipple 26. The neck 44 is formed with a valve seat 46, against which the valve ball B is seated during sprinkling. In order to mount the sprinkler outlet nipple 32 in the valve housing portion H (FIG. 4), a bore 47 is formed in the housing which receives the neck 48 of the sprinkler nipple 32. The neck 48 is also formed with a valve seat indicated at 49, against which the ball is seated at the end of a sprinkling cycle. In order to mount the cap portion C of the housing, the upper housing portion H is formed with a neck 50 at its lower end, that snugly receives the upper end of the cap, and these parts are cemented together upon final assembly. The lower face of the neck 50 of the housing portion H is grooved as at 51 to mount the valve actuating assembly, as will be described.

The cap C has molded integrally therewith a plurality of combined valve actuator assembly support and spring guide ribs 52. Although four such ribs are shown in the drawings for clarity, the cap may be provided with six or more of the ribs. In order to mount the valve actuating mechanism, a clamping ring 53 is provided, which has a centering sleeve portion 54 located at the upper ends of ribs 52. The clamping ring 53 is provided at its upper end with a seating flange 55, the under face of which seats on the upper ends of ribs 52. The upper face of the flange is grooved at 56 for mounting the actuating mechanism. A seating shoulder 60 is formed adjacent the lower end of housing portion H, for engagement by the upper end of cap C.

Details of the pressure responsive actuating mechanism will now be described. As mentioned, the major components of this mechanism are the reservoir chamber diaphragm R, the control chamber diaphragm K, the metering plate M and the stool S. As can be seen, the stool is integral with the control chamber diaphragm K, and the metering plate M is disposed between the two diaphragms.

The reservoir chamber diaphragm R is formed with a peripheral mounting flange 62, which is ribbed to fit the groove 56 in the upper face of the clamping ring 53. The reservoir chamber diaphragm includes a fixed wall or supporting sleeve 64, that projects downwardly from the mounting flange 62 and is backed up by the sleeve portion 54 of the clamping ring 53. Connected to the lower end of the fixed wall portion 64 of the reservoir diaphragm, and projecting upwardly therefrom, is a rolling wall portion 66, the upper end of which is closed by a piston portion 68, so that the diaphragm R acts as a plunger or piston member. A metal cap 72 reinforces the lower face of piston portion 68, and forms the upper seat for a liquid transfer spring 74. The spring bottoms on the cap, and is guided by the lower ends of the ribs 52 molded on the inside of the cap.

The metering plate M is clamped against the upper face of flange 62 of the reservoir diaphragm R. The metering plate is provided with a metering orifice 80 for transfer of liquid back and forth through the orifice.

The control chamber diaphragm K is provided with a lower mounting flange 82, which is ribbed to fit the groove 51 in the lower face of the neck of the valve housing H. The control chamber diaphragm K is formed with a fixed wall or sleeve portion 84 that is backed up by the wall of the housing portion H. The diaphragm K is also provided with a rolling wall portion 86, integrally connected at its lower end to the fixed wall portion 84. The upper end of the rolling wall portion 86 is closed by a base portion 88 of the stool S, and projecting upwardly from the base 88 of the stool, is the neck portion 90 of the stool. The neck 90 terminates in a ball supporting platform 92.

As best seen in FIGS. 5–8, the stool platform 92 is provided with a bias ledge 94, for urging the valve ball towards the valve seat 46 of the conduit outlet port. The stool platform is also provided with a bias ledge 96, positioned for urging the valve ball toward the seat 49 of the sprinkler port. As seen in FIG. 9, projecting downwardly from the base 88 of the stool is a boss 98, for engaging the metering plate and determining the lowermost position of the stool platform. The various parts of the reservoir diaphragm R and the control chamber diaphragm K are molded integrally from rubber or rubberlike material. The two diaphragms and the metering plate cooperate to form an upper, or control chamber 100 (FIGS. 3 and 9, for example) and a lower or reservoir chamber 102 (FIGS. 9 to 11). The operation of the valve actuator will be explained presently.

The valve ball B is composite, having a metal core 106 and a rubber cover 107. The diameter of the metal core of the valve ball exceeds that of the conduit and sprinkler ports, so that the ball cannot become jammed in these ports. Also the dimensions of neck 90 of the stool preclude jamming of the ball between the neck and the housing. As best seen in FIG. 4, guide ribs 108 center the ball laterally.

In assembling the parts just described, the nipples 24 and 26 may have been previously bonded to the housing portion H, or they may now be coated with solvent at their necks and assembled with the housing portion H. The housing portion H is inverted, the ball B is dropped into the inverted housing portion, and the control chamber diaphragm K is slipped into place in the housing. The control chamber 100 of the diaphragm K is then filled with a thick silicone oil, using a pressurized nozzle. This material is in reality a thin grease, in that it does not readily flow by gravity alone. However, being a silicone compound, its viscosity does not materially change with temperature.

Spring cap 72 is fitted into the reservoir diaphragm R, and the diaphragm is placed face up on a table. The reservoir chamber 102 is then filled with the same silicone compound by the pressurized nozzle. The metering plate M is placed on top of the flange 62 of the reservoir chamber diaphragm R, and spring 74 is inserted in the diaphragm R. The diaphragm R, spring, and metering plate assembly are now slipped into the cap C. The clamping ring 53 will have been previously bonded to the cap C. The cap and the parts assembled therein are now inverted and slipped over the housing H, to bring the flange 55 of the clamping ring against the flange 62 of the reservoir diaphragm R. The silicone material does not leave the reservoir chamber during this operation because of its viscosity. At this time, the end of the cap C will be spaced somewhat from the shoulder 60 formed on the housing H. A plastic material solvent cement will have been applied to the neck of the housing and to the cap portion that engages the neck. Thus, after the assembly operations just described have been completed, the assembly is placed in a press under a force of 400 pounds, and the cap is bottomed against the shoulder 60 of the housing and held in that position for four hours. This compresses the flanges of the diaphragms and causes them to seal not only against the metering plate M but against the associated portions of the cap and housing. After the assembly has remained in the press for four hours, the joint between the cap C and the housing portion H will be strong enough to resist the spreading force of the rubber diaphragms, and the assembly is removed from the press. The assembly is held at 100° F. for 20 hours to completely cure the plastic joints and provide a strong integral construction. Thus, a sealed valve actuating unit is provided which includes the control chamber 100 and the reservoir chamber 102 previously referred to, with these chambers being interconnected by the orifice 80 in the metering plate M. Since the nipples 24 and 26 need not withstand an internal pressure of 400 pounds, as must the cap C and housing H, these parts can be assembled after the valve is removed from the press, if desired.

A valve ball push off plug assembly 112 is also assembled on the housing portion H, preferably after the assembly operation previously described. The push off plug assembly 112 includes a plastic body having a stem portion 114 and a cap portion 116. Snugly embracing the stem portion is a rubber boot 120, which is formed with a peripheral flange 122 that extends along the under surface of the cap portion of the plug. The lower end of the boot has a thickened ball-engaging foot 124, which foot is spaced from the lower end of the stem portion 114. Solvent type plastic cement is applied around the periphery of the cap portion 116, and the plug assembly is pushed through a bore in the upper end of the housing H, which bore snugly receives the rubber boot. The cement bonds the peripheral cap portion 116 of the push off assembly to the body of the housing portion H, to complete the assembly of the sequence valve.

The operation of the sequence valve of the present invention will now be described in detail, including references to the various improved features of the valve embodied in the present invention.

Initial Condition of the Valve

The initial or idle condition of the valve is illustrated in FIGURES 3 and 4 of the drawings. In this condition, the valve has not received water under pressure from the supply line and the conduit into which the valve is connected. The spring 74 holds the piston portion 68 of the reservoir diaphragm R against the metering plate M, and most of the oil is in the control chamber 100. The wall portion 86 of the control diaphragm K has lifted the stool S to bring valve ball B against the foot portion 124 of boot 120, the valve ball B is now supported opposite the outlet conduit port. The spacing of the parts is such that boot 120 is deformed with the valve ball B in its upper position. The deformation of the boot, coupled with the initial bias action of the ledge 94 on the stool, urges the valve ball B toward the outlet conduit port or valve seat 46. The valve ball may not be in full engagement with the valve seat 46 of the conduit outlet, but the combined action of the ledge 94 of the stool and the boot 120 on the push off plug, urges the valve ball against, or quite close to seat 46 at the outlet conduit.

Sprinkling

The condition of the valve during the sprinkling period is illustrated in FIGURE 9 of the drawings. Water under pressure is now being supplied to the valve, and the ball is forced into firm sealing engagement with the conduit outlet port seat 46. Water under pressure has collapsed the boot 120, so that the foot portion 124 thereof is pressed against the stem 114. When water is first supplied to the valve, the stool S is in its upper position, as illustrated in phantom in FIGURE 9. Initially, as water flows through the sprinkler port and valve seat 49, the neck portion 90 of the stool S partially restricts such flow, which increases the upstream conduit pressure. This restriction of flow by the stool neck provides adequate upstream conduit pressure for re-seating the valve balls in all of the upstream valves. As described, these valves have completed their sprinkling cycles, so that valve balls must be re-seated against the sprinkler port valve seats, upon reapplication of pressure to such valves.

Referring again to FIGURE 9, as the sprinkling cycle continues, the unbalanced pressure on the control chamber diaphragm K moves the diaphragm wall 86 and the stool downwardly, as indicated by the feathered arrow in FIGURE 9. This decreases the volume of the control chamber 100, and transfers silicone oil from the control chamber 100 to the reservoir chamber 102. This increase in volume of the reservoir chamber is resisted by compression of the spring 74. Soon after pressure has been supplied to the valve, the cocking action of the actuator just described is completed by the bottoming of the stop 98 on the metering plate M, and no further transfer of fluid through the orifice in the metering plate occurs. The platform portion 92 of the stool is now disposed below the sprinkling port so that during the major portion of the sprinkling cycle, the stool provides no obstruction to flow of water from the inlet conduit port to the sprinkler port.

Valve Shifting

After completion of the sprinkling cycle, the timing and control mechanism 16 reduces or cuts off the water pressure in the supply line and conduits. As seen in FIGURE 10, when water pressure in the valve under discussion is reduced, the boot 120 assumes its normal, undeformed position. Also, pressure no longer forces the valve ball against the conduit outlet valve seat. Thus the combined action of the boot, and the force of gravity acting on the valve ball, cause the ball to immediately drop toward the stool below. The initial stage of this action is indicated by the feathered arrow in FIGURE 10. As seen in FIGURE 11, early in the valve shifting period the stool S supports the ball in front of the sprinkler port, with the ledge 96 on the stool platform urging the valve ball towards the sprinkler port.

During this valve shifting cycle, which is a period of temporary pressure reduction, the actuator spring 74 urges the piston portion 68 of the reservoir chamber diaphragm R in a direction to reduce the volume of oil in the reservoir chamber 102, and transfers a small volume of oil through the metering port 80 into the control chamber 100. However, due to the combined effect of the viscosity of the oil in the actuator, the small diameter of the metering orifice, and the spring rate of the spring 74, this reverse action of the actuator during the valve shifting period is insufficient to lift the stool appreciably from its lowermost position. Thus at the end of the momentary interruption in pressure, the valve ball is still supported by the stool in substantially precise alignment with the sprinkler outlet port.

Water Transfer Period

Referring again to FIGURE 11, at the end of the momentary pressure reduction period, the timing and control mechaism re-establishes full water pressure in the conduits. Thus, the valve under discussion is now supplied with water under pressure from the inlet conduit port, and since the ball and stool are completely clear of this port as well as being clear of the conduit outlet port, water can flow straight through the valve housing. Thus water is delivered to the downstream sequenve valve for sprinkling without obstruction. Simultaneously, water under pressure in the housing quickly seats the valve ball against the sprinkling port valve seat 49, and holds the ball in sealing engagement with the sprinkler port. At the same time water pressure, acting upon the wall portion 86 of the control chamber diaphragm K, keeps the valve actuator cocked, and holds the stool in its lowermost position. The slight volume of oil that was transferred from the reservoir chamber 102 during the valve shifting period, is soon returned to the reservoir chamber.

Terminal Resetting

After all of the sequence valves in the system have completed their sprinkler cycle, it is necessary that the valves be reset to the initial condition of FIGURES 3 and 4, for the initiation of a new irrigation cycle. This resetting of the valves is accomplished by establishing a period of reduced water pressure that is considerably longer than the period that elapses during the valve shifting operation. Thus, in accordance with the setting of the timer or control device 16 at the main supply line, after sprinkling has been completed by the last sequence valve in each line, the water pressure through the conduits is reduced or cut off for a period long enough to permit the valve spring 74 to retransfer the oil from the reservoir chamber 102 (FIG. 11) back into the control chamber 100 (FIGS. 3 and 4). This action continues until the piston portion 68 of the reservoir diaphragm bottoms on the metering plate. When this occurs, the valve ball will have been returned to the position illustrated in FIGURES 3 and 4, with the stool holding the ball up against the boot of the push off plug, and in front of the conduit outlet port ready for a new cycle of operation.

In case it is desired to make it possible to install the valve housing into the conduits for flow through the valve in either direction, the stool construction of FIG. 12 is employed. Here the platform portion 92a of the stool S–1 has a flat upper surface, without bias ledges. Thus either conduit nipple 24 or 26 can be the inlet nipple without affecting operation of the sequence valve.

Typical Physical and Operating Data

| | |
|---|---|
| Approximate number of valves per conduit | 30–60. |
| Approximate number of valves in a system | 4000. |
| Sprinkler time | 15–30 min. |
| Valve actuating period | 5–10 sec. |
| Resetting period | App. 10 min. |
| Operating line pressure | 20–80 p.s.i. |
| Port diameter | ¾ inch. |
| Valve ball diameter | 1³⁄₁₆ inches. |
| Stool platform diameter | ¾ inch. |
| Stool neck diameter | ⁷⁄₁₆ inch. |
| Viscosity of silicone oil | 30,000 centistokes at approx. room temp. |

These details are not limiting, but are merely presented as an example of a preferred embodiment of the invention, in order that one skilled in the art may practice the invention without need for experimentation.

The invention having thus been described, what is claimed and desired to be secured by Letters Patent is:

1. A fluid pressure operated sequence irrigation valve comprising a housing having a conduit inlet port, a conduit outlet port and a sprinkler outlet port below said conduit ports, a valve ball freely movable in said housing for alternatively closing one of said outlet ports under force of water pressure in the housing while simultaneously opening the other outlet port, and water pressure responsive valve actuating means in said housing; said actuating means including a hydraulic chamber having a movable upper wall, a stool projecting upwardly from the upper wall of said chamber for supporting said valve ball, and resilient means associated with said chamber for extending said stool and lifting said valve ball into position opposite said conduit outlet port, said valve actuating means being cocked upon application of water under pressure to said valve to move said chamber wall against the force of said resilient means and lower said stool to a position below said sprinkler outlet port while the water under pressure in said housing maintains said valve ball sealed against said conduit outlet port, temporary reduction of water pressure in said housing releasing said valve ball from its position at said conduit outlet port whereupon said valve ball drops by gravity back onto said stool and in front of said sprinkler outlet port, resumption of full water pressure in said housing sealing said valve ball against said sprinkler outlet port while water flows without obstruction through said conduit ports for entering the next sequence valve.

2. A fluid pressure operated sequence irrigation valve comprising a housing having a conduit inlet port, a conduit outlet port and a sprinkler outlet port below said conduit ports, a valve ball freely movable in said housing for alternatively closing of said outlet ports under force of water pressure in the housing while simultaneously opening the other outlet port, and water pressure responsive valve actuating means in said housing; said actuating means including a fixed metering plate, a movable ball member sealed with the upper side of said metering plate to form a control chamber, a movable wall member sealed with the other side of said metering plate to form a reservoir chamber, a liquid sealed in said chambers, spring means for transferring said liquid from said reservoir chamber to said control chamber, a stool projecting upwardly from said control chamber wall member for lifting said valve ball into position opposite said conduit outlet port, said valve actuating means being cocked upon application of water under pressure to said valve to transfer liquid from said control chamber to said reservoir chamber through said metering plate, said stool thereby being lowered to a position below said sprinkler outlet port, water under full pressure in said housing maintaining said valve ball sealed against said conduit outlet port, temporary reduction of water pressure in said housing releasing said valve ball from its position at said conduit outlet port whereupon said valve ball drops by gravity back onto said stool and in front of said sprinkler outlet port, resumption of full water pressure in said housing sealing said valve ball against said sprinkler outlet port while water flows without obstruction through said conduit ports for entering the next sequence valve.

3. A fluid pressure operated sequence irrigation valve comprising a housing having a conduit inlet port, a conduit outlet port and a sprinkler outlet port below said conduit ports, a valve ball freely movable in said housing for alternatively closing one of said outlet ports under force of water pressure in the housing while simultaneously opening the other outlet port, and water pressure responsive valve actuating means in said housing; said actuating means including a hydraulic chamber having a movable upper wall, a stool projecting upwardly from the upper wall of said chamber for supporting said valve ball, and resilient means associated with said chamber for extending said stool and lifting said valve ball into position opposite said conduit outlet port, said valve actuating means being cocked upon application of water under pressure to said valve to move said chamber wall against the force of said resilient means and lower said stool to a position below said sprinkler outlet port while the water under pressure in said housing maintains said valve ball sealed against said conduit outlet port, temporary reduction of water pressure in said housing releasing said valve ball from its position at said conduit outlet port whereupon said valve ball drops by gravity back onto said stool and in front of said sprinkler outlet port, resumption of full water pressure in said housing sealing said valve ball against said sprinkler outlet port while water flows without obstruction through said conduit ports for entering the next sequence valve, said stool having ledge means formed thereon for urging the valve ball toward said outlet ports.

4. A fluid pressure operated sequence irrigation valve comprising a housing having a conduit inlet port, a conduit outlet port and a sprinkler outlet port below said conduit ports, a valve ball freely movable in said housing for alternatively closing one of said outlet ports under force of water pressure in the housing while simultaneously opening the other outlet port, water pressure responsive valve actuating means in said housing; said actuating means including a hydraulic chamber having a movable upper wall, a stool projecting upwardly from the upper wall of said chamber for supporting said valve ball, and resilient means associated with said chamber for extending said stool and lifting said valve ball into position opposite said conduit outlet port, and resilient valve ball dislodging means mounted in said housing above said conduit outlet port, said stool holding said valve ball in deforming engagement with said dislodging means when the stool is in its upper position, said valve actuating means being cocked upon application of water under pressure to said valve to move said chamber wall against the force of said resilient means and lower said stool to a position below said sprinkler outlet port while the water under pressure in said housing maintains said valve ball sealed against said conduit outlet port, temporary reduction of water pressure in said housing releasing said valve ball from its positioning at said conduit outlet port whereupon said valve ball drops by gravity back onto said stool and in front of said sprinkler outlet port, said dislodging means insuring release of the valve ball from said conduit outlet port, resumption of full water pressure in said housing sealing said valve ball against said sprinkler outlet port while water flows without obstruction through said conduit ports for entering the next sequence valve.

5. A fluid pressure operated sequence irrigation valve comprising a housing having a conduit inlet port, a conduit outlet port and a sprinkler outlet port below said conduit ports, a valve ball freely movable in said housing for alternatively closing one of said outlet ports under force of water pressure in the housing while simultaneously opening the other outlet port, and water pressure responsive valve actuating means in said housing; said actuating means including opposed movable walls forming a control and reservoir chamber walls with metering means between the chambers, valve ball support means on said control chamber wall, liquid sealed in said chambers, and resilient means for transferring said liquid from said reservoir chamber through said metering means, and into said control chamber, valve ball support means for lifting said valve ball into position opposite said conduit outlet port, said valve actuating means being cocked upon application of water under pressure to said valve to transfer liquid into said reservoir chamber and lower said valve ball support means to a position below said sprinkler outlet port while the water under pressure in said housing maintains said valve ball sealed against said conduit outlet port, temporary reduction of water pressure in said housing releasing said valve ball from its position at said conduit outlet port whereupon said valve ball drops by gravity back onto said valve ball support means and in front of said sprinkler outlet port, resumption of full water pressure in said housing sealing said valve ball against said sprinkler outlet port while water flows without obstruction through said conduit ports for entering a downstream sequence valve.

References Cited in the file of this patent

UNITED STATES PATENTS

| | | |
|---|---|---|
| 1,013,695 | Storer | Jan. 2, 1912 |
| 1,422,444 | Howland | July 11, 1922 |

FOREIGN PATENTS

| | | |
|---|---|---|
| 90,523 | Sweden | Oct. 12, 1937 |